Jan. 2, 1923.

S. B. HOWLAND ET AL.
STORAGE BATTERY BOX.
FILED FEB. 27, 1922.

1,441,152.

S. B. Howland
H. S. Howland
INVENTOR

BY Victor J. Evans
ATTORNEY

WITNESS:

Patented Jan. 2, 1923.

1,441,152

UNITED STATES PATENT OFFICE.

STEPHEN B. HOWLAND AND HERBERT S. HOWLAND, OF BERKSHIRE, NEW YORK.

STORAGE-BATTERY BOX.

Application filed February 27, 1922. Serial No. 539,644.

*To all whom it may concern:*

Be it known that we, STEPHEN B. HOWLAND and HERBERT S. HOWLAND, citizens of the United States, residing at Berkshire, in the county of Tioga and State of New York, have invented new and useful Improvements in Storage-Battery Boxes, of which the following is a specification.

Our present invention has reference to a storage battery box for use on an automobile.

Our object is to produce a box for the reception of a storage battery which shall be constructed in a simpler, cheaper and stronger manner than boxes usually employed for this purpose.

A further object is to produce a box for storage batteries for automobiles constructed of wood in which the bottom is spaced from the sides to allow expansion without bulging of the sides; in which the ends of the box have their edges formed with angularly arranged tongues that are received in grooves whose walls are arranged at an angle in the sides of the box, and also wherein the box is completely bound with a lead band which will resist all action of acid from the battery and also bind every part of the box together.

The foregoing, and other objects which will appear as the nature of the invention is better understood, may be accomplished by a construction, combination and operative association of parts, such as is disclosed by the drawing which accompanies and which forms part of this specification.

In the drawing:—

Figure 1:
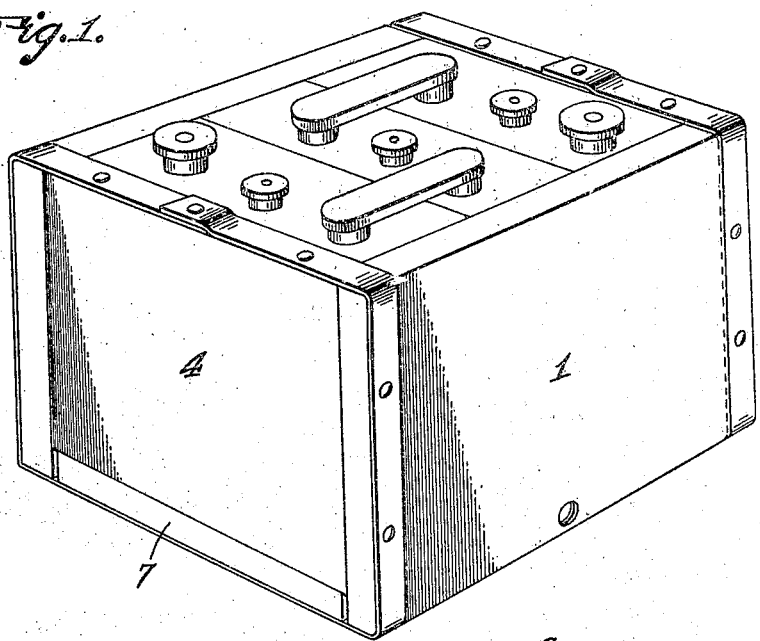
Figure 1 is a perspective view of a storage battery in accordance with this invention.
Figure 2:
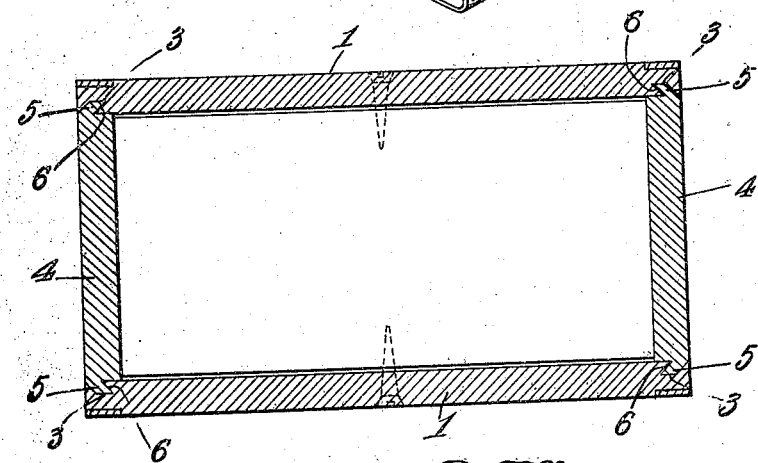
Figure 2 is a horizontal sectional view therethrough.
Figure 3:
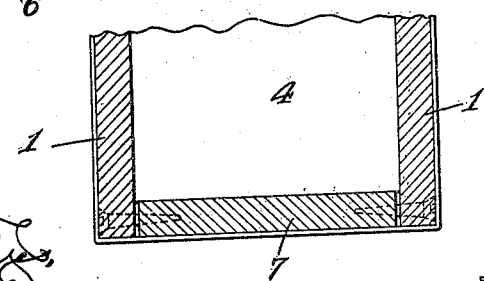
Figure 3 is a sectional view on the line 3—3 of Figure 2.

Our improved storage battery box is, except for the lead binding constructed wholly of wood that is suitably heated as near an acid-proof heat as can be procured. The sides 1 of the box, from their inner corners are grooved throughout their width, the opposed walls provided by the grooves being arranged at similar inward angles. These grooves are indicated by the numeral 3.

The ends 4 of the box have their outer corners formed with tongues 5, the opposed walls of the said tongues being arranged at similar angles, and the angle tongues of the ends are designed to be received in the angle grooves of the sides. This arrangement provides a dove-tail connection between the sides and ends of the box which, however, does not weaken either the sides or ends of the construction thereof, which is true with respect to the ordinary dove tails. The construction is such that the substantially V-shaped tongues 6 provided between the ends and the inner walls of the grooves are in contacting engagement with the inner angle walls of the tongues on the ends of the box, and these walls effectively resist outward pressure between the sides, while the outer angle walls of the tongues and grooves prevent an outward movement of the ends from the sides.

The bottom 7 may be nailed or otherwise secured to the lower edges of the ends, the ends being of a less height than the sides, whereby the under face of the bottom 7 is disposed flush with the lower edges of the sides. The bottom 7 is spaced from the sides, as clearly disclosed by the drawing, and this space or clearance will allow for expansion without danger of bulging the sides.

Arranged around the edges of the box at the corners thereof are lead or other acid-proof bands, the same being nailed or otherwise secured to the outer faces of the sides, the edges of the ends and the under face of the bottom of the box.

It is thought that the foregoing description, when taken in connection with the drawings will fully set forth the simplicity of the construction and the advantages of the improvement to those skilled in the art to which this invention relates, and that further detailed description will therefore not be required.

Having described the invention, we claim:—

A storage battery box including sides, ends and a bottom, said sides having inwardly inclined grooves entering from the outer corners thereof, said ends having their outer corners formed with inwardly inclined tongues which are received in the grooves of the sides, said ends being of a less height than the ends, the bottom being secured to the lower edges of the ends and being spaced from the sides, and non-corrosive bands arranged around the jointed portions of the box secured to the upper edges of the ends, the outer faces of the sides and the under face of the bottom.

In testimony whereof we affix our signatures.

STEPHEN B. HOWLAND.
HERBERT S. HOWLAND.